UNITED STATES PATENT OFFICE.

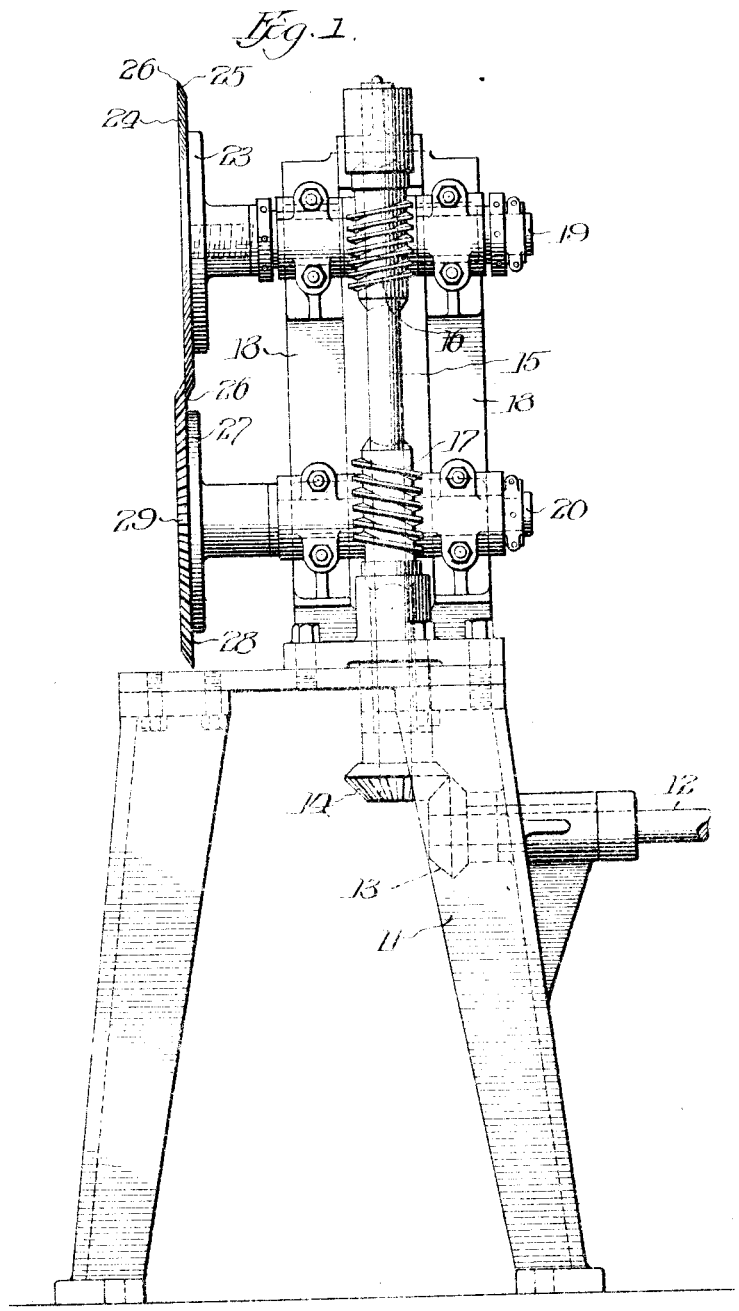

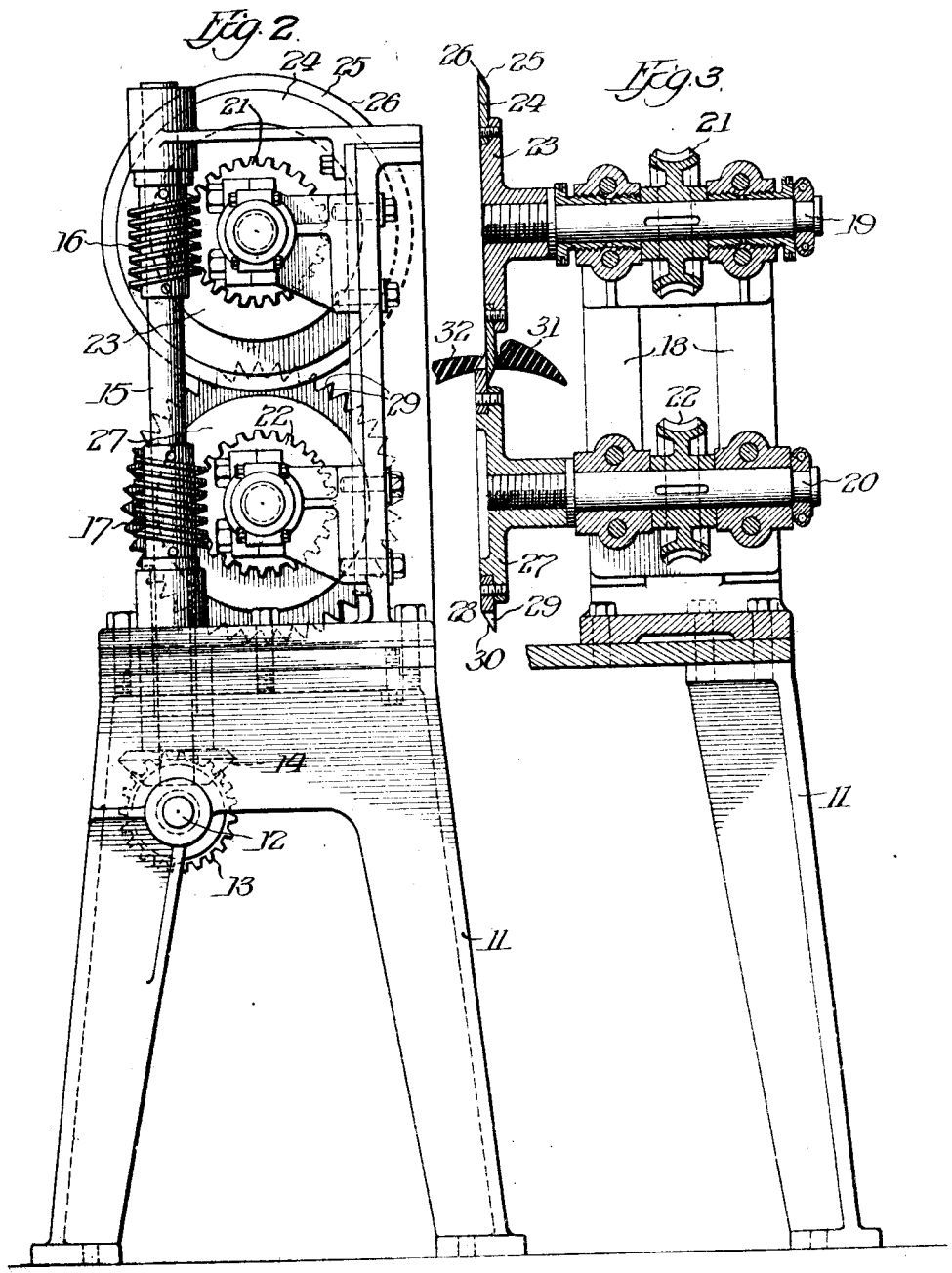

WILLIAM C. STEVENS, OF AKRON, OHIO, ASSIGNOR TO THE FIRESTONE TIRE & RUBBER COMPANY, OF AKRON, OHIO, A CORPORATION OF OHIO.

MACHINE FOR CUTTING OFF BEADS.

1,181,354.     Specification of Letters Patent.     Patented May 2, 1916.

Application filed September 27, 1913. Serial No. 792,074.

*To all whom it may concern:*

Be it known that I, WILLIAM C. STEVENS, a citizen of the United States, residing at Akron, in the county of Summit and State of Ohio, have invented certain new and useful Improvements in Machines for Cutting Off Beads, of which the following is a specification.

It is customary in the case of old and worn out or defective tires to treat the same in order to regain the rubber therein for use in making other tires. The bead of such tires, however, contains such a small percentage of rubber that it is not available from an economical standpoint and for this reason the bead is customarily removed from the old tire prior to treatment for salvage of the rubber in the latter.

This invention has for its object the provision of novel and efficient means for cutting the bead from old tires.

In order that the invention may be readily understood a preferred embodiment of the same is set forth in the accompanying drawings and in the detailed description based thereon. As, however, the invention is capable of embodiment in other and varied constructional forms the drawing and description are to be construed in an illustrative and not in an unnecessarily limiting sense.

In the drawings—Figure 1 is a side elevation of such a machine; Fig. 2 is a rear elevation of the same; and Fig. 3 is a vertical section through the machine.

Having reference to the drawing in detail, upon the machine frame 11 is suitably journaled a drive shaft 12 having fixed thereon a miter gear 13 in mesh with a similar gear 14 carried by a countershaft 15. The counter shaft 15 is provided with worms 16 and 17 of similar pitch, one having a right hand and the other a left hand thread. Suitably journaled in the standards 18, 18 of the frame are a pair of driven shafts 19 and 20 having fixed thereon respectively worm wheels 21 and 22 in mesh respectively with the worms 16 and 17.

The driven shaft 19 has mounted thereon a disk 23 having a peripheral cutting portion 24 beveled upon one face at 25 to provide a continuous knife edge 26, the front face of the cutting portion being in substantially one plane.

Upon the driven shaft 20 is mounted a disk 27 having a peripheral cutting portion 28 serrated at 29, the serrations beveled on the front face to provide double cutting edges, the rear face of the cutting portion being in substantially one plane closely adjacent and parallel to the front face of the disk 23.

The continuous knife edge of the disk 23 and the serrated cutting edge of the disk 27 are disposed in overlapping shearing relation as clearly shown in the drawing, the disks being driven in opposite directions at a uniform peripheral speed by means of the worm gear from the countershaft 15.

In operation the length of tire is fed, as illustrated in Fig. 3, between the two disks, the lower serrated disk engaging the tire with its serrations and feeding the same forward positively while at the same time the sharpened edges of the teeth coöperate with the continuous sharpened edge of the disk 23 to shear the bead 31 from the body 32 of the tire.

By the employment of the two disks, one having a continuous knife edge and the other a serrated cutting edge in the relation shown and described, the tire is fed positively and prevented from buckling or jamming while the cut is accomplished by a smooth shearing action whereby the difficulties usually encountered in cutting rubber impregnated fabric are avoided.

I claim:

1. A machine of the character described, comprising two rotatable over-lapping cutting disks, parallel on their abutting faces, one of said disks having pointed serrated slitting teeth.

2. The combination of a pair of disks having cutting edges arranged in overlapping shearing relation, one of the disks having a continuous knife edge beveled on one face only and the other having pointed serrated cutting teeth, the serrations beveled on one face only, and means to drive the disks, substantially as described.

3. The combination of a pair of disks having cutting edges arranged in overlapping shearing relation, one of the disks having a continuous knife edge beveled on one face only and the other having pointed serrated cutting edges, the serrations beveled on one face only, the opposed faces of the disks in their contact area being in substantially parallel planes, and means to drive the disks, substantially as described.

In testimony whereof I have hereunto signed my name in the presence of two subscribing witnesses.

WILLIAM C. STEVENS.

Witnesses:
R. E. GLASS,
S. G. CARKHUFF.